United States Patent [19]

Ditlinger

[11] 4,010,828

[45] Mar. 8, 1977

[54] BRAKE ADJUST AND RESET APPARATUS

[75] Inventor: Richard J. Ditlinger, South Bend, Ind.

[73] Assignee: The Bendix Corporation, South Bend, Ind.

[22] Filed: Oct. 22, 1975

[21] Appl. No.: 624,621

[52] U.S. Cl. .......................... 188/71.8; 188/196 P; 192/111 A
[51] Int. Cl.² ................... F16D 55/02; F16D 65/52
[58] Field of Search .............. 188/71.1, 71.5, 71.7, 188/71.8, 72.1, 72.4, 79.5 R, 196 R, 196 P, 71.9; 192/111 R, 111 A

[56] References Cited

UNITED STATES PATENTS

| 2,888,109 | 5/1959 | Tankersley | 188/196 P |
|---|---|---|---|
| 3,376,959 | 4/1968 | Holcomb, Jr. et al. | 188/196 R |
| 3,844,388 | 10/1974 | Ditlinger et al. | 188/196 R |
| 3,887,047 | 6/1975 | Harnish et al. | 188/196 P |
| 3,957,146 | 5/1976 | Le Blanc | 188/196 PX |

*Primary Examiner*—Trygve M. Blix
*Assistant Examiner*—Douglas C. Butler
*Attorney, Agent, or Firm*—Joseph P. Kulik; William N. Antonis

[57] ABSTRACT

An automatic brake adjust and reset device particularly adapted for use in a multiple disc aircraft disc brake and having one or more spring loaded axially movable tubular members engaged by a movable cutting member connected to and actuated by a brake applying pressure plate. A pair of spaced apart fixed stops operatively connected to the tubular member serve to limit axial movement thereof to a brake released position under the influence of the spring load thereon and to a brake applying position under the influence of the brake applying pressure plate connected to the cutting member. The tubular member is fixed at the brake applying position whereupon continued movement of the pressure plate and cutting member attached thereto results in cutting or slitting of the tubular member by the cutting member to the extent necessary to compensate for axial wear of the multiple brake discs. Upon release of the brake, the pressure plate is retracted to the extent permitted by the spring actuated tubular member which moves to the brake released position. A plurality of tubular members arranged in concentric order and associated cutting members operative to cut or slit the same in sequential order may be provided to extend the range of brake adjustment accordingly.

6 Claims, 7 Drawing Figures

BRAKE ADJUST AND RESET APPARATUS

BACKGROUND OF THE INVENTION

Automatic brake adjust and reset apparatus of the deformable tube type with and without extensible adjustment features are well known in the aircraft disc brake art as evidenced by U.S. Pat. No. 3,376,959 to O. L. Holcomb, Jr. et al. (common assignee) and U.S. Pat. No. 3,887,047 to E. E. Harnish et al. (common assignee). The present invention is an improvement over the above-mentioned prior art brake adjust and reset devices particularly the extensible type of U.S. Pat. No. 3,887,047 in that cutting of the tubular member has been found to require simpler structure as well as less strict tolerance characteristics of the size and material of the tubular member in comparison to that of U.S. Pat. No. 3,887,047.

SUMMARY OF THE INVENTION

The present invention relates to an automatic brake adjust and reset device particularly adapted for use in a multiple disc aircraft brake and including tubular means adapted to be cut by cutting means engageable therewith during an application of the brake to thereby compensate for wear of the friction discs and maintain a predetermined disc running clearance upon release of the brake.

It is an object of the present invention to provide brake adjust and reset apparatus having cuttable tubular means adapted to be cut by cutting means to a degree dependent upon wear of the friction elements of the brake.

It is another object of the present invention to provide brake adjust and reset apparatus having a plurality of telescoping cuttable tubular members engaged by associated cutting members which are actuated in sequential order into cutting engagement therewith by a brake applying pressure plate to provide adjustment and reset of the pressure plate in accordance with brake disc wear and wherein the brake adjustment range of the plurality of tubular members is in excess of any one of the same.

It is an important object of the present invlention to provide brake adjust and reset apparatus wherein the operating characteristics of the same is primarily dependent upon the resistance of a tubular member to a cutting member urged longitudinally through the wall thereof.

Other objects and advantages of the present invention will be apparent from the following description taken with the accompanying drawings.

DESCRIPTION OF THE PREFERRED EMBODIMENT

Figure 1:
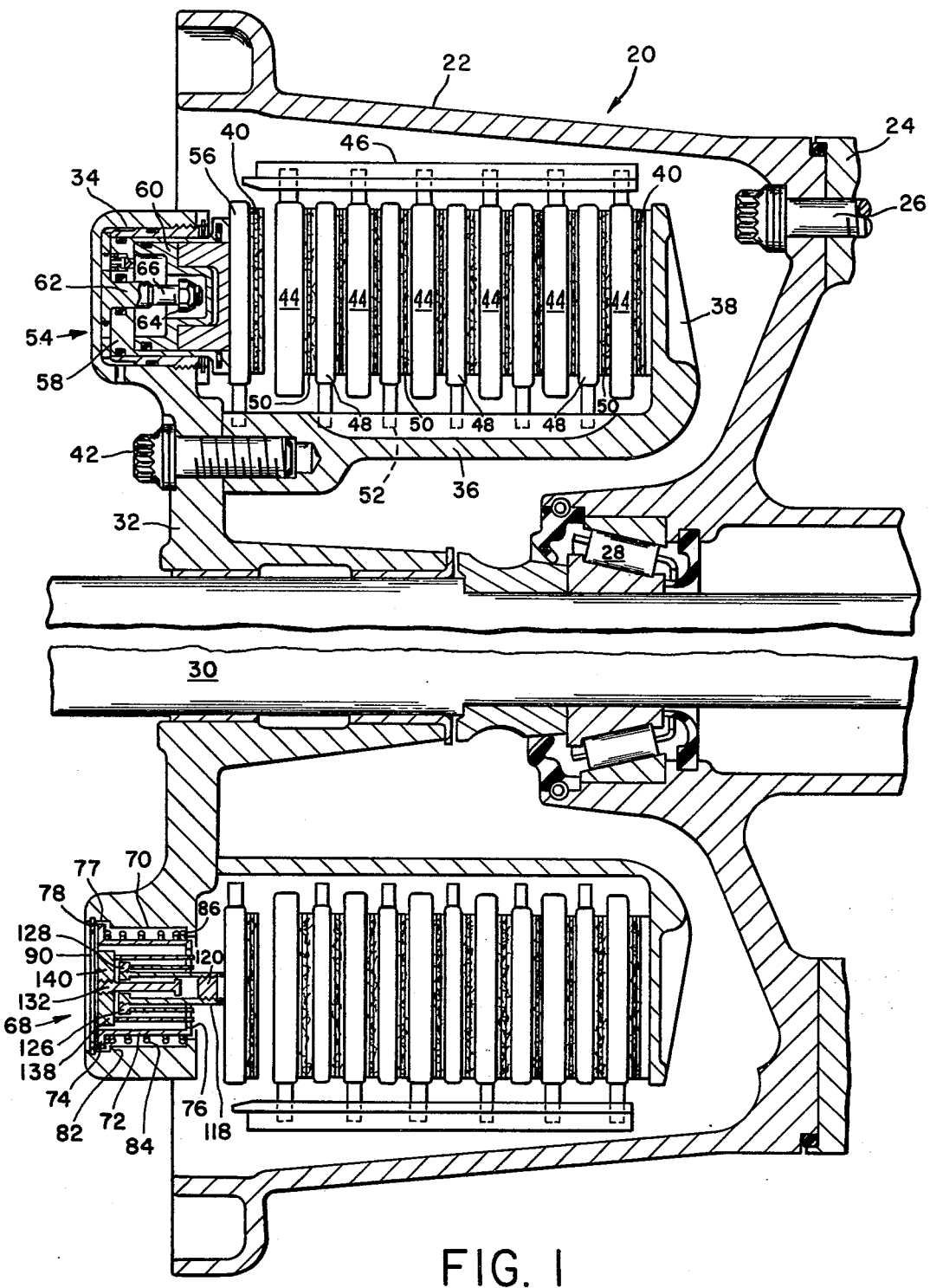
FIG. 1 is a schematic representation of an aircraft wheel and brake embodying the present invention.
Figure 2:
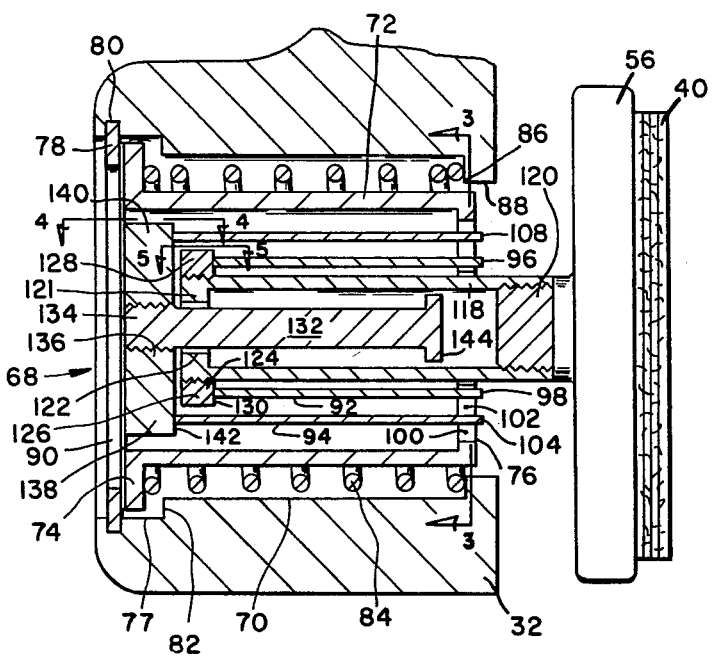
FIG. 2 is a schematic view in cross section of the present invention shown in enlarged form and removed from the wheel and brake structure of FIG. 1.
Figure 7:
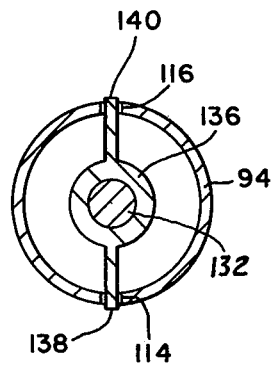
FIG. 7 is a section view taken on line 7—7 of FIG. 4.
Figure 4:
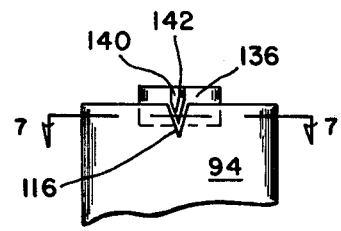
FIG. 4 is a section view taken on line 4—4 of FIG. 2.
Figure 3:
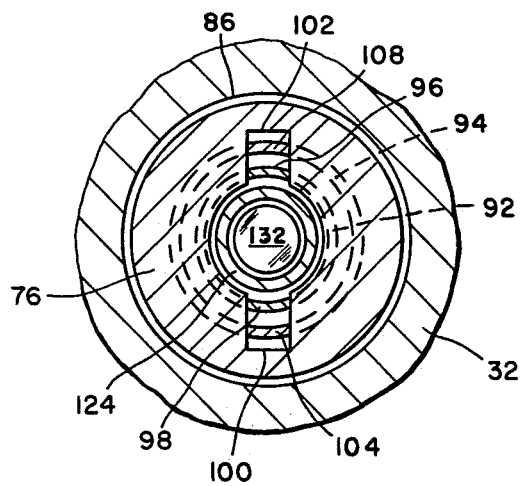
FIG. 3 is a section view taken on line 3—3 of FIG. 2.
Figure 5:
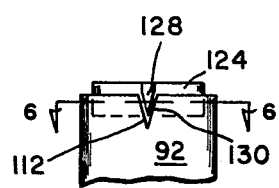
FIG. 5 is a section view taken on line 5—5 of FIG. 2.
Figure 6:
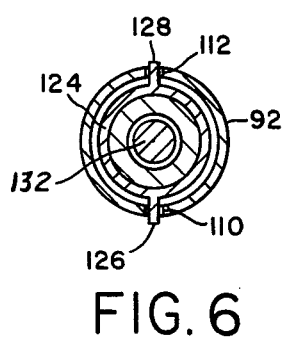
FIG. 6 is a section view taken on line 6—6 of FIG. 5.

Referring to the drawings and, in particular, FIG. 1, numeral 20 designates an aircraft wheel and multiple disc brake therefor. The wheel and brake is conventional in that it includes two annular wheel sections 22 and 24, only one of which is shown in entire cross sectional form, fastened together by a plurality of circumferentially spaced apart bolts and nuts generally indicated by 26. The wheel 20 is suitably journalled by bearings means including roller bearings 28 on a rotatably fixed axle 30 which, in turn, is fixedly secured to conventional landing gear or strut structure, not shown. An annular brake carrier 32 suitably keyed to axle 30 is provided with a plurality of circumferentially spaced apart cavities 34, only one of which is shown, vented to a source of pressurized fluid, not shown, controlled by the aircraft operator. A torque tube 36 having an integral backing plate 38 suitably lined with friction material 40 is fixedly secured to carrier 32 by a plurality of circumferentially spaced apart bolts 42 only one of which is shown. A plurality of spaced apart rotatable annular brake rotor members 44 suitably attached to a plurality of circumferentially spaced apart key or retaining members 46, only one of which is shown, are adapted to slide thereon axially relative to wheel section 22. A plurality of non-rotatable annular brake stator members 48 which alternate with rotor member 44 are provided with friction material 50 secured to opposite faces thereof and are suitably keyed for axial movement on torque tube 36 as at 52.

The cavities 34 are each provided with piston means generally indicated by 54 which, upon brake application, are simultaneously pressurized by the fluid in cavities 34 thereby displacing a pressure plate 56 against which the piston means bear towards the backing plate 38 to urge the rotor members 44 and stator members 48 into frictional engagement thereby retarding rotation of wheel 20. The pressure plate 56, like backing plate 38, is lined with friction material 40.

It will be understood that the piston means 54 is necessarily confined to a limited space and must have an axial travel sufficient to compensate for the accumulative axial wear of the friction linings 40 and 50 over a period of brake use. Reference is made to U.S. Pat. No. 3,789,738 to R.F. Horner (common assignee) for a detailed disclosure of the structure and operation of the piston means 54. For the purpose of the present disclosure, it is sufficient to understand that the piston means 54 is made in two piston sections 58 and 60. The piston section 58 is slidably carried on a fixed post 62 having a stop 64 which is engaged by piston section 58 to limit the axial travel of the latter in response to pressurization of cavity 34. The piston section 60 is slidably carried by piston section 58 and pressurized by fluid passing between a reduced diameter section 66 of post 62 and piston section 58 when the latter engages stop 64 thereby pressurizing piston section 60 which moves axially relative to piston section 58. Thus, the available range of movement of piston means 54 is the travel of piston section 58 as limited by stop 64 plus the subsequent travel of piston section 60 depending upon the extent of wear of the friction linings 40 and 50.

The axial movement of pressure plate 56 actuated by piston means 54 to compress the rotor and stator members 44 and 48 together is a direct indication of the wear status of friction linings 40 and 50 and may be adjusted to compensate for such lining wear. To that end, the present invention comprising brake adjust and reset apparatus is connected to the pressure plate 56 to progressively advance the same as brake wear occurs and retract the pressure plate 56 a predetermined distance upon release of the piston means 54 to provide a predetermined running clearance when the brake is released. A plurality of brake adjust and reset devices generally indicated by 68 are arranged in axially extending circular cavities 70 arranged in circumferentially spaced apart relationship in carrier 32. Each brake adjust and reset device 68 includes a cylindrical housing 72 having a radially outwardly extending annular flange 74 on one end and a radially inwardly extending annular wall 76 on the opposite end. The annular flange 74 extends into a counterbored end portion 77 of cavity 70 and is adapted to move axially between a snap ring 78 removably secured in a mating recess 80 in counterbored portion 77 and an end wall 82 of counterbored portion 77. The snap ring 78 and end wall 82 act as stop members and define brake released and brake applying positions of the housing 72 as will be described. A compression spring 84 interposed between annular flange 74 and a radially inwardly extending annular wall 86 defining a reduced diameter opening 88 at the one end of cavity 70 serves to bias flange 74 into engagement with snap ring 78. A cover plate 90 interposed between flange 74 and snap ring 78 serves to prevent dirt or other debris from entering the cavity 70.

Inner and outer tubular members 92 and 94 coaxial with cylindrical housing 72 are contained by the latter in radially spaced apart relationship. The tubular member 92 bears against wall 76 and is provided with axially extending diametrically opposite tangs 96 and 98 which are received by slots 100 and 102, respectively, in annular wall 76. The tubular member 94 bears against wall 76 and is provided with axially extending diametrically opposite tangs 104 and 108 which are received by slots 100 and 102, respectively. The above-mentioned tang and slot arrangement serves to prevent relative rotation between tubular members 92 and 94 thereby maintaining diametrically opposite V-shaped notches 110 and 112 in the opposite end of tubular member 92 in alignment with diametrically opposite V-shaped notches 114 and 116 in the adjacent end of tubular member 94. A tubular member 118 fixedly secured at one end to pressure plate 56 as by a threaded connection generally indicated by 120 extends through inner tubular member 92 coaxial therewith. The free end of tubular member 118 is walled as at 121 and provided with a central opening 122. An annular threaded member 124 is threadedly secured to the free end of tubular member 118 is provided with diametrically opposite radially outwardly extending arms 126 and 128 provided with respective cutting edges 130 which are received by V-shaped notches 110 and 112.

A stem or rod 132 slidably extending through opening 122 is provided with a threaded end 134 threadedly engaged with an annular member 136 which has integral diametrically opposite radially outwardly extending arms 138 and 140 provided with respective cutting edges 142 which are received by V-shaped notches 114 and 116 of tubular member 94. An enlarged diameter end portion 144 on the free end of stem or rod 132 is adapted to be engaged by the wall 121 thereby providing a positive connection between tubular member 118 and rod 132 and thus annular member 124 secured to rod 132.

The various elements of the brake adjust and reset apparatus are shown in FIGS. 1 to 4 in a position prior to cutting action by the cutting arms 126, 128 and 138, 140. It will be understood that residual fluid pressure acting against piston means 54 imposes sufficient force against pressure plate 56 to maintain cutting arms 126 and 128 in notches 110 and 112, respectively, thereby preventing misalignment of the same before cutting action occurs. The cutting arms 138 and 140 are maintained in notches 114 and 116 by making the axial depth of notches 114 and 116 as well as the axial length of tangs 104 and 108 slightly larger than the running clearance established by snap ring 78 and end wall 82 between which the housing 72 moves during brake operation. As shown in FIG. 1, the cover plate 90 provides a stop against movement of cutting arms 138 and 140 away from notches 114 and 116.

In operation, the brake is applied by pressurization of the plurality of piston means 54 which urge pressure plate 56 toward backing plate 38 thereby compressing the rotor and stator members 44 and 48 together to effect the desired degree of braking of wheel sections 22 and 24.

The tubular member 118 being attached to pressure plate 56 moves therewith causing inner tubular member 92 and housing 72 to move axially against the resistance of spring 84 until flange 74 engages end wall 82 thereby fixing the position of inner tubular member 92. Assuming the friction linings 40 and 50 to be worn to the extent that the pressure plate 56 must be further advanced to cause full engagement of the rotor and stator members 44 and 48 the force derived from piston means 54 will overcome the resistance of inner tubular member 92 to diametrically opposite cutting edges 130 allowing the latter to slice axially through the tubular member 92 which, in turn, permits the pressure plate 56 to advance until the rotor and stator members 44 and 48 are fully engaged.

Upon brake release or depressurization of piston means 54 the pressure plate 56 is urged away from the backing plate 38 under the influence of the compression spring 84 causing the housing 72 to move accordingly out of engagement with end wall 82 and into engagement with cover plate 90 bearing against snap ring 78, thereby limiting retraction of pressure plate 56 accordingly to establish the aforementioned predetermined brake running clearance. It will be recognized that the arms 126 and 128 are effectively trapped in the slots made by cutting edges 130 in the tubular member 92 by virtue of the tendency for the slots to close upon the arms 126 and 128 and by the aforementioned residual brake pressure that tends to urge the pressure plate 56 away from the carrier 32. The tubular members 92 and 94 may be made from any suitable metal such as aluminum or the like having the desired resistance to cutting action by cutting edges 130. Obviously, the wall thickness of tubular member 92 must be taken into consideration in determining the force required to urge cutting edges through tubular member 92.

The above-mentioned cutting operation of the inner tubular member 92 is repeated in subsequent brake applications to compensate for progressive wear of the linings 40 and 50. Upon reaching the end portion of tubular member 92, the arms 126 and 128 pass through slots 100 and 102, respectively, thereby permitting cutting edges to clear tubular member 92. The wall 121 engages end portion 144 simultaneously with clearing of tubular member 92 by cutting edges 130 whereupon the arms 138 and 140 with cutting edges 142 are urged axially through outer tubular member 94 in the same manner as arms 126 and 128 with cutting edges 130 through inner tubular member 92 thereby providing a range of adjustment of the pressure plate 56 which is the sum of travel of cutting edges 130 through inner tubular member 92 and the travel of cutting edges 142 through outer tubular member 94. It will be understood that the arms 138 and 140 pass through the slots in inner tubular member 92 made by cutting edges 130 such that the same force is required for cutting edges 142 to cut through outer tubular member 94 as cutting edges 130 to cut through inner tubular member 92. Since the cutting edges 130 are not in engagement with inner tubular member 92 when cutting edges 142 becomes active an outer tubular member 94 the force transfer from inner tubular member 92 to outer tubular member 94 is substantially unnoticeable by the aircraft operator.

In the event that the extended range of adjustment provided by tubular member 94 is not required in a given brake, the outer tubular member 94, cutting arms 138 and 140 and rod 132 may be eliminated without affecting the operation of inner tubular member 92 described above.

It will be noted that the entire range of brake adjustment provided by both tubular members 92 and 94 should be more than adequate to compensate for the life of the friction lining 40 and 50 of any given brake such that the cutting edges 142 will not traverse the entire length of outer tubular member 94.

Various changes or modifications of the above described structure may be made without departing from the scope of Applicant's invention as defined by the following claims.

I claim:
1. An automatic brake adjust and reset apparatus for a disc brake having an axially movable pressure plate for applying the brake comprising:
   carrier means provided with at least one cavity;
   an annular housing disposed in said cavity and provided with an end wall;
   spaced apart first and second stop means adapted to be engaged by said housing to establish limits to axial travel of said housing;
   tubular means coaxially arranged with said housing and bearing against said end wall; and
   cutting means secured to said pressure plate and engageable with said tubular means;
   said housing being actuated into engagement with said second stop means in response to actuation of said cutting means by said pressure plate in a brake applying direction whereupon continued movement of said pressure plate results in motion of said cutting means axially through the wall of said tubular means to compensate for frictional wear of said disc brake;
   said housing being actuated into engagement with said first stop means in response to actuation of said pressure plate in a brake release direction to establish a predetermined brake running clearance;
   said tubular means including telescoping radially spaced apart inner and outer tubular members;
   said cutting means including a first set of oppositely extending arms having cutting edges engageable with said inner tubular member and a second set of oppositely extending arms having cutting edges engageable with said outer tubular member;
   said first set of arms being secured to one end of a tube the opposite end of which tube is secured to said pressure plate;
   said second set of arms being secured to one end of a rod extending into said tube coaxial therewith;
   said rod having an enlarged diameter end portion adapted to be engaged by said tube;
   said inner and outer tubular members being engaged in sequence by said first and second sets of arms having cutting edges, respectively, in response to movement of said pressure plate in a brake applying direction to provide a range of adjustment of said pressure plate in excess of the axial length of either of said inner and outer tubular members.

2. Automatic brake adjust and reset apparatus as claimed in claim 1 wherein:
   said inner and outer tubular members are each provided with diametrically opposite notches at one end thereof adapted to receive said cutting edges of said respective first and second sets of arms;
   said inner and outer tubular members each having axially extending diametrically opposite tangs;
   said end wall having slots therein adapted to receive said tangs to prevent relative rotation between said inner and outer tubular members and maintain said diametrically opposite notches in alignment.

3. Automatic brake adjust and reset apparatus as claimed in claim 1 wherein:
   said first set of arms having cutting edges being progressively actuated axially through the wall of said inner tubular member to provide a first range of adjustment of the position of said pressure plate to compensate for wear of said disc brake;
   said second set of arms having cutting edges being actuated by said tube axially through the wall of said outer tubular member to provide a second range of adjustment of said pressure plate to compensate for wear of said disc brake;
   said second set of arms passing through the cuts made in said inner tubular member by said first set of arms.

4. Automatic brake adjust and reset apparatus as claimed in claim 1 wherein:
   said end wall is provided with diametrically opposite slots therein through which said first set of arms passes to clear said inner tubular member.

5. Automatic brake adjust and reset apparatus for a disc brake having an axially movable pressure plate for applying the brake comprising:
   carrier means provided with at least one cavity; an annular housing disposed in said cavity and provided with an end wall;
   spaced apart first and second stop means adapted to be engaged by said housing to establish limits to axial travel of said housing;
   tubular means coaxially arranged with said housing and bearing against said end wall; and
   cutting means secured to said pressure plate and engageable with said tubular means;
   said housing being actuated into engagement with said second stop means in response to actuation of said cutting means by said pressure plate in a brake applying direction whereupon continued movement of said pressure plate results in motion of said cutting means axially through the wall of said tubular means to compensate for frictional wear of said disc brake;

said housing being actuated into engagement with said first stop means in response to actuation of said pressure plate in a brake release direction to establish a predetermined brake running clearance;

said tubular means including telescoping coaxial inner and outer tubular members arranged in radially spaced apart relationship;

said cutting means includes first and second cutting members operatively engaged with said inner and outer tubular members, respectively, an operative to cut axially therethrough in sequential order in response to movement of said pressure plate.

6. Automatic brake adjust and reset apparatus as claimed in claim 5 wherein:

said first and second cutting members are aligned to enable said second cutting member to pass through the axial slot made by said first cutting member in said inner tubular member as said second cutting member cuts axially through said outer tubular member.

* * * * *